United States Patent
Herley

(10) Patent No.: US 7,142,235 B2
(45) Date of Patent: Nov. 28, 2006

(54) OPPORTUNISTIC IMPROVEMENT OF DIGITAL CAMERA IMAGE QUALITY

(75) Inventor: Cormac Herley, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 163 days.

(21) Appl. No.: 09/126,622

(22) Filed: Jul. 30, 1998

(65) Prior Publication Data

US 2003/0048360 A1 Mar. 13, 2003

(51) Int. Cl.
*H04N 5/76* (2006.01)
*H04N 5/228* (2006.01)

(52) U.S. Cl. ............... 348/231.2; 348/231.3; 382/246; 382/250; 382/251

(58) Field of Classification Search .......... 382/232, 382/235, 243–246, 248, 250–251, 298, 299; 358/443–444, 448, 450, 452; 348/207, 220, 348/231–233, 222, 552, 333.01, 333.05
See application file for complete search history.

(56) References Cited

U.S. PATENT DOCUMENTS

| | | | | |
|---|---|---|---|---|
| 5,164,831 A * | 11/1992 | Kuchta | ............... | 348/231.7 |
| 5,231,514 A * | 7/1993 | Nakamura | ............... | 358/444 |
| 5,333,212 A * | 7/1994 | Ligtenberg | ............... | 382/250 |
| 5,335,016 A * | 8/1994 | Nakagawa | ............... | 348/220 |
| 5,530,478 A * | 6/1996 | Sasaki | ............... | 375/240.04 |
| 5,568,199 A * | 10/1996 | Kajimoto | ............... | 375/240.23 |
| 5,648,816 A * | 7/1997 | Wakui | ............... | 348/231.9 |
| 5,724,579 A * | 3/1998 | Suzuki | ............... | 707/104.1 |
| 5,838,834 A * | 11/1998 | Saito | ............... | 382/251 |
| 5,861,918 A * | 1/1999 | Anderson | ............... | 348/231.9 |
| 5,926,569 A * | 7/1999 | Nickerson | ............... | 382/232 |
| 5,930,398 A * | 7/1999 | Watney | ............... | 382/250 |
| 5,991,452 A * | 11/1999 | Shimizu | ............... | 382/248 |
| 6,137,914 A * | 10/2000 | Ligtenberg | ............... | 382/240 |
| 6,181,826 B1 * | 1/2001 | Weldy | ............... | 382/240 |
| 6,243,108 B1 * | 6/2001 | Takiyama et al. | ............... | 345/537 |
| 6,246,797 B1 * | 6/2001 | Castor | ............... | 382/232 |
| 6,263,106 B1 * | 7/2001 | Yamagata | ............... | 382/232 |
| 6,266,375 B1 * | 7/2001 | Chang | ............... | 375/240.03 |
| 6,334,027 B1 * | 12/2001 | Fukuoka et al. | ............... | 386/117 |
| 6,738,092 B1 * | 5/2004 | Nakagawa et al. | ............... | 348/231.3 |

* cited by examiner

*Primary Examiner*—Ngoc-Yen Vu
*Assistant Examiner*—Carramah J. Quiett

(57) ABSTRACT

Opportunistic image quality improvement in a digital camera. In a digital camera having a picture memory of fixed size for storing a predetermined number of pictures, raw image data is compressed to form primary and auxiliary data sets. The primary data set allows the image to be reconstructed at a first quality level. The primary and auxiliary data sets combined allow the reconstruction of the image at a higher quality level. As images are taken and processed, if sufficient storage space exists in the picture memory, both primary and auxiliary data sets are stored. This continues until the memory is full of primary and auxiliary data sets. Once the memory is full, as more images are taken and stored, the space used by auxiliary data sets is reclaimed for use by primary data sets, and the auxiliary data sets are not stored.

20 Claims, 2 Drawing Sheets

OPPORTUNISTIC IMPROVEMENT OF DIGITAL CAMERA IMAGE QUALITY

FIELD OF THE INVENTION

This invention relates to the field of digital cameras, and more particularly, to the techniques used to store picture data in a fixed size storage medium.

ART BACKGROUND

A typical digital camera system takes raw data from an image sensor, processes that data, and stores the resulting image in a digital memory device. Typical memory devices used in digital cameras for picture storage include rotating memory such as disks, or solid state memory such as Flash EEPROM, static, or dynamic RAM. The picture memory may be permanently mounted in the camera, or may be removable, for example in the form of a cartridge or card. The picture memory is typically of a fixed size, and is partitioned into a number of picture slots for storing a predetermined number of pictures. The raw image is usually quite large in comparison to the size of the picture memory. Typically a lossy compression scheme is used to process the raw image data prior to storage, trading off image detail for the ability to store more images in the picture memory. Compression ratios from 16 to 20 to 1 are common, allowing many images to be stored in the camera, while still maintaining good image quality.

For example, assume a camera is to store 20 images in a picture memory. Each image must therefore be compressed to take up $1/20$th of the memory. Typically a scalar quantization lossy compression scheme such as JPEG is used for this purpose, with some form of rate control algorithm employed to ensure that each image, once compressed, indeed fits into its allotted space in the storage. As implied by the name, in a lossy compression scheme such as JPEG, image detail is lost in the compression process.

Generally there will be some variation in the compressed image sizes. For instance in the example given, each compressed image should be approximately $1/20^{th}$ of the size of the memory. Compression produces a smaller image that achieves the compromise between image quality and the size of the image data. As the user takes a picture, the raw image data is compressed and stored in the picture memory. When the user has completed taking a set of pictures, the compressed image data is transferred to another device, and the space used by those images may be freed so that other image may be stored.

In the example given, after the user has taken one picture, approximately $1/20$th of the picture memory is in use and image detail has been lost, even though $19/20$ths of the picture memory is unused. After ten pictures have been taken, half the picture memory is in use, image detail has been lost on each of the images, and approximately half the picture memory is unused. What is desired is a way to opportunistically exploit the unused picture memory to provide higher quality images.

SUMMARY OF THE INVENTION

The present invention provides for higher quality digital images in a digital camera system when fewer than the maximum number of images permitted by the size of the picture memory have been taken. Image compression is performed to produce a primary compressed data set and an auxiliary compressed data set. The primary compressed data set is sufficient to reproduce the image at a first quality level. The primary and auxiliary data sets when combined reproduce the image at a higher quality level. As images are taken and primary and auxiliary data sets formed, the primary data set is stored in picture memory. If storage space is available, the auxiliary data set is also stored in the picture memory. When picture memory is filled by primary and auxiliary data sets, the space containing auxiliary data sets is reclaimed to store additional primary data sets. Thus, if the user takes less than the maximum number of images permitted by the device, at least some of the images will have improved quality when the image data is used.

BRIEF DESCRIPTION OF THE DRAWINGS

The present invention is described with respect to particular exemplary embodiments thereof and reference is made to the drawings in which.

DETAILED DESCRIPTION

Figure 1:
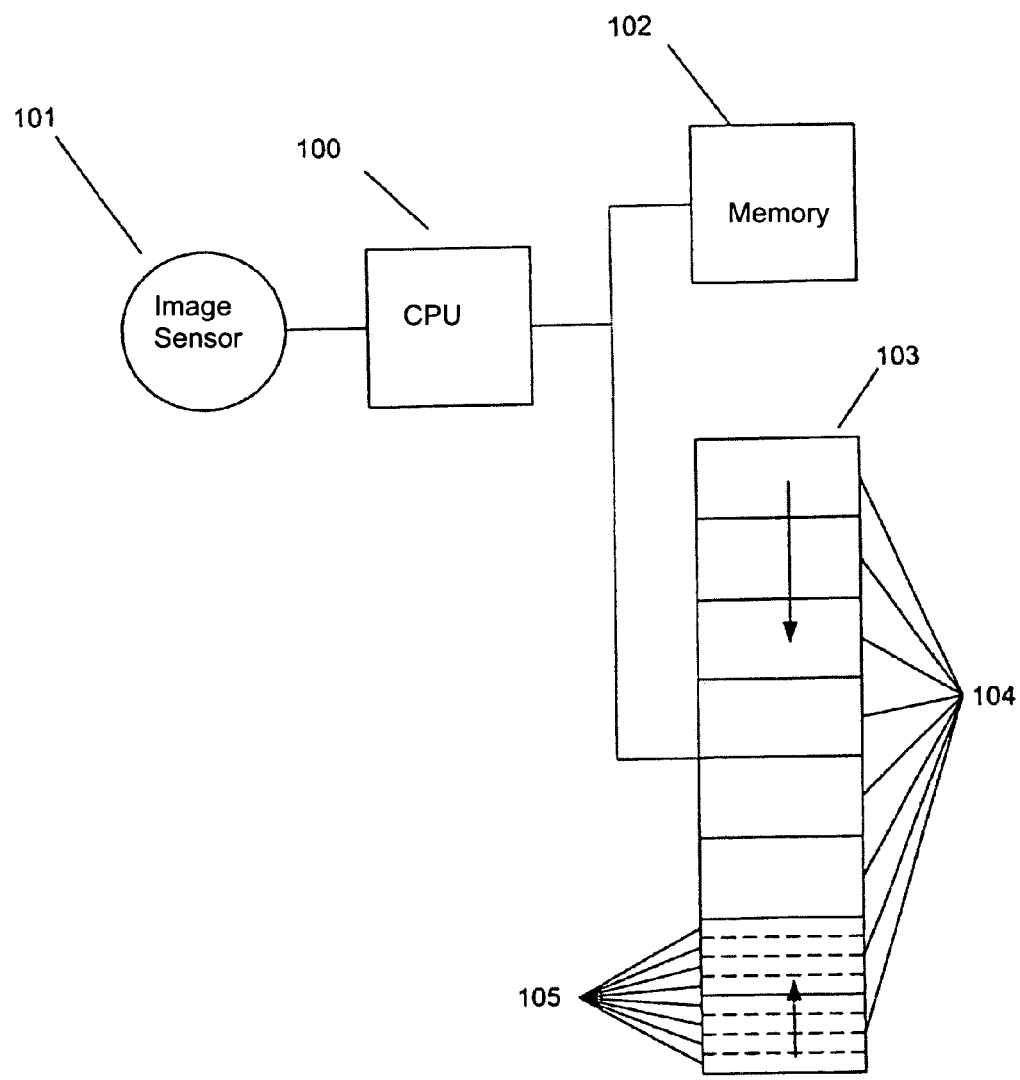
FIG. 1 shows a block diagram of a digital camera.

A typical digital camera is shown in block form in FIG. 1. Central processing unit (CPU) 100 transfers raw image data from image sensor 101 under control of programs contained in program memory 102. It the image is a color image, it may first be transformed to some other color space than the space in which it was acquired. For example, it may be computationally more convenient to transform RGB data into luminance-chrominance data. This transform allows the luminance (Y) data to be compressed as in a monochrome image, while the chrominance (U) data may be compressed typically 15 to 20 times more than the luminance, resulting in additional savings. CPU 100 produces a primary compressed data set and an auxiliary compressed data set from the raw image data for storage in picture memory 103. CPU 100 may be a general purpose processor, or may be a digital signal processor (DSP). It is also known in the art to perform image processing using a special purpose processor, such as a DSP or a dedicated hardware compression engine connected to a general purpose processor. Depending on the particular architecture, picture memory 103 may be a solid state memory such as flash EEPROM or RAM, or may be a rotating memory device such as a disc storage device. Not shown in this simplified diagram are items such as power supplies, user controls, and other input/output devices. The digital camera of FIG. 1 may be a unitary device, an image sensor connected to a dedicated processing subsystem, or may comprise an image sensing subsystem connected to a general purpose computer operating under the control of a specific program.

The present invention deals with the methods used for processing image data and forming compressed images. While the descriptions given are presented with respect to JPEG standard compression, they are applicable to other compression schemes using scalar quantization, such as Wavelets.

The JPEG compression algorithm commonly used for compressing color images consists of the following major steps:

(1) Color transformation, (2) DCT transformation, (3) Quantization of DCT coefficients, and (4) Run length and Huffman coding of quantized values.

JPEG compression is known in the art, and is described for example by G. K. Wallace in "The JPEG Still Picture Compression Standard", *Communications of the ACM*, Vol. 34, No. 4, April 1991, pp. 31–44.

As mentioned earlier, color image data may be transformed from one color space to another, for example from the RBG color space typically used by color image sensors to a chrominance-luminance space to achieve higher compression ratios. The image data is then transformed, using a transform such as the Discrete Cosine Transform (DCT). The DCT separates the image into parts or spectral subbands of differing importance. The DCT is similar to the Discrete Fourier Transform in that it transforms an image from the spatial domain to the frequency domain. DCT based image compression takes advantage of the fact that most of the energy in an image tends to be in the lower spatial frequencies. A useful introduction to the DCT and its use in image compression written by Dr. James F. Blinn is "What's the Deal with the DCT", *IEEE Computer Graphics and Applications*, July 1993, pp. 78–83.

For the purposes of this invention, step (3), quantizing the DCT coefficients is the key. It is this quantization process that introduces loss. The following compression step (4) is lossless in nature. As in known in the art, DCT coefficients are quantized, replacing a range of values with a single value, usually an integer, covering that range or step size. The step sizes used by the quantizer are different for different DCT coefficients, the relative sizes set by a predefined matrix of quantization step sizes. Typical implementations use a single parameter, often called the Q-factor, to control the amount of compression. The Q-factor controls the step sizes in a linear fashion; it does not control the compression ratio directly; by increasing the step size, the compressed image size becomes smaller, but with increased loss of information.

Figure 2:
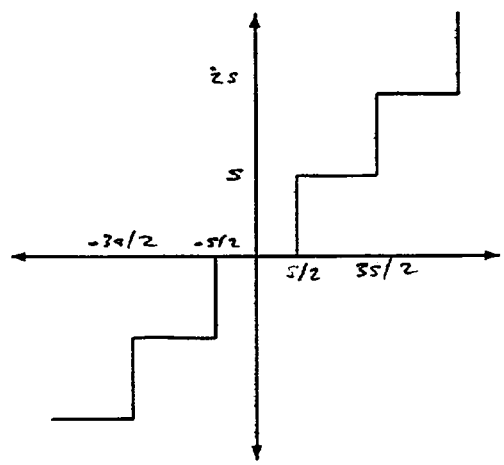
FIG. 2 shows a uniform scalar quantizer of step size s.

The type of quantizer used for the DCT coefficients is shown in FIG. 2; known as a mid-thread scalar quantizer. All input values (along the horizontal axis) in the range (−s/2, s/2) get represented as zero. All input values which have absolute value in the range (s/2, 3s/2) are represented by s (along the vertical axis) as appropriate, and so on. Once quantization has been performed, we cannot reconstruct the lost information; for example, after quantization we cannot distinguish between values that are just larger than s/2 and those that are just smaller than 3s/2. They are both quantized to the same value s and no further information is available.

Figure 3:
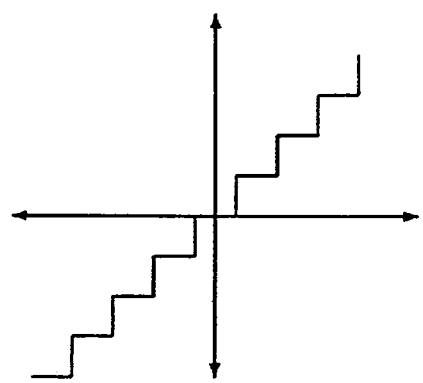
FIG. 3 shows a uniform scalar quantizer of step size s/2.

If we used a quantizer with a step size half the size of that shown in FIG. 2 we would be able to reconstruct with twice the accuracy, as shown in FIG. 3. The penalty of course is that since the quantizer has twice as many output levels, one additional bit of accuracy, there is a lot more information to be encoded in step (4), and the size of the compressed data set is larger.

Figure 4:
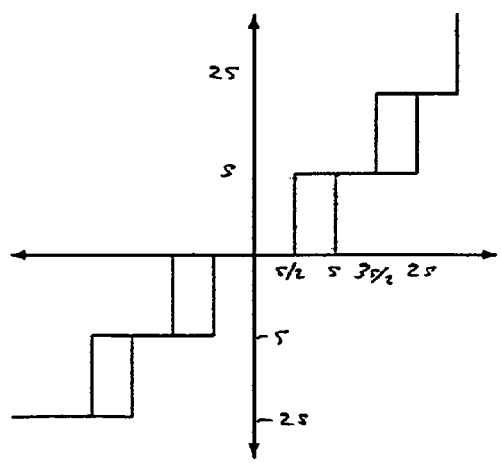
FIG. 4 shows primary and auxiliary quantizers of step size s.

In a first embodiment of the present invention, a similar result to using a half size quantizer as shown in FIG. 3 is achieved using two quantizers. If the thresholds of the second quantizer subdivide the intervals of the first, then combining the outputs of both quantizers is as good as using a single quantizer with a smaller step size, as illustrated in FIG. 4. The first quantizer is the primary quantizer and produces the primary image. The second quantizer is the auxiliary quantizer and produces the auxiliary image. These are shown in FIG. 4. Note that in FIG. 4 all intervals of the primary quantizer (except the zero interval) are halved by the thresholds of the auxiliary quantizer. Thus, for example, if a DCT coefficient is in the interval (s/2, 3s/2) the primary quantizer will quantize it to the level s. However, the auxiliary quantizer will quantize DCT coefficients that are less than s to 0, and values greater than s to s. Thus, during decoding, the outputs of the auxiliary quantizer, if they are available, allow us to refine our estimates of the quantized DCT coefficients, thereby reconstructing the image with greater fidelity. Other approaches may also be used for the auxiliary quantizer, such as subdividing the intervals of the primary quantizer.

The use of the auxiliary quantizer results in a relatively small increase in complexity of the overall compression system. The DCT coefficients have already been calculated. They are quantized twice, by the primary and auxiliary quantizers, and the two sets of quantized coefficients encoded separately, producing the primary image and the auxiliary image. The encoding process for the quantized coefficients can involve Huffman coding, or other entropy coding methods.

Note particularly that the outputs of the primary and auxiliary quantizers differ only in their least significant bits. Therefore we need only store that least significant bit of the auxiliary quantizer's output, and not the entire output. Furthermore when a dead-zone quantizer such as the one shown in FIG. 4 is used, any coefficient that quantizes to zero using the primary quantizer will also quantize to zero using the auxiliary quantizer. Thus with the addition of run length encoding to the outputs of the primary quantizer, runs of zeros for the primary quantizer correspond to runs of zeros for the auxiliary quantizer, and only one extra bit per non-zero coefficient output from the primary quantizer is required to uniquely define the output of the auxiliary quantizer. Typically, the number of bits required for the auxiliary quantizer, can be on the order of 15% to 18% the size of the primary quantizer's output.

It is also possible to refine the zero interval in the auxiliary quantizer, since this interval is the only interval of the auxiliary quantizer that is not refined when a dead zone quantizer is used. This entails using extra bits in the auxiliary bitstream that determine which subinterval of the zero interval of the primary quantizer the DCT coefficient lies. A variety of entropy coding techniques known to the art can be employed to efficiently represent this information.

A second embodiment of the quantizing process uses a single quantizer with half the final step size, such as the s/2 quantizer shown in FIG. 3. The least significant bit of the quantizer output becomes the auxiliary data stream, with the remaining bits forming the primary data stream. In this embodiment, when a particular value of the primary data stream is nonzero, the corresponding auxiliary data bit is incorporated into the data stream. In the case where the primary value is zero, not every auxiliary data bit may be incorporated, as this would greatly increase the size of the auxiliary image. Instead, an approach such as rate control must be incorporated, to make selective use of the auxiliary data bits.

Processing the image data according to the present invention therefore produces a primary image, and a smaller auxiliary image. In storing the resulting images, the picture memory initially starts out empty when no pictures have been taken. Referring back to FIG. 1, as pictures are taken, the primary image is stored in picture memory 103 in a primary image slot 104. If space is available, the auxiliary image is also stored in picture memory 103 in auxiliary image slot 105. As shown, auxiliary image slots 105 may be obtained by subdividing primary image slots 104. This process continues as further pictures are taken until insufficient free space remains to store additional primary images. As further pictures are taken beyond this point, only the primary images are stored, reclaiming used auxiliary image slots 105. Since the auxiliary images typically take up less space than a primary image, on the order of 15 to 20 percent as much space, auxiliary images will typically be reclaimed in blocks in order to recover sufficient storage for an additional primary image. For example, assume a digital camera is designed to hold 20 images, and an auxiliary image takes 20% of the space of a primary image. This five to one size ratio allows the camera to store 16 primary images and 16 auxiliary images. When the 17th primary image must be stored, the space taken up by 5 auxiliary images must be reclaimed.

Various approaches may be used in selecting which of the auxiliary images is to be reclaimed. The approach may be as simple as sequential reuse, where auxiliary images are reclaimed in first in, first out order. This scheme has the effect of preserving the higher quality of the last images in a set. A sequential reuse approach reclaiming auxiliary images last to first has the more intuitive result of retaining higher image quality in the first pictures taken. This may be implemented as shown in FIG. 1 by simply storing the primary images sequentially from the beginning of the camera memory, and storing the auxiliary images working back from the end of the camera memory, filling the memory from both ends. Once the camera memory is full, storage of primary images continues sequentially, reclaiming auxiliary images. Another approach is to reclaim the least valuable auxiliary data set first, by associating a quality metric with each pair of primary and auxiliary data sets, and reclaiming the auxiliary image that adds the least additional information to its associated primary image.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. A method for processing images in a digital camera wherein the digital camera includes an image storage device having primary and secondary storage areas, comprising the steps of:
   inputting a raw image;
   generating from the raw image, including employing a first quantizing step, a first compressed image data set suitable for reproducing substantially the entire image at a first quality level, the first compressed image data set being stored in the primary storage area; and
   generating from the raw image, including employing a second quantizing step independent of the first quantizing step, a second compressed image data set which supplies at least a least significant bit missing in the first compressed image data set for combination with the first compressed image data set to reproduce substantially the entire image at a second, higher quality level, the second compressed image data set being stored in the secondary storage area; and
   releasing space used to store the second compressed image data set associated with the raw image in the secondary storage area of the image storage device to store a first compressed image data set associated with another raw image when insufficient space is available in the primary storage area of the image storage device to store the first compressed image data set associated with another raw image.

2. The method of claim 1, wherein the step of generating a first compressed image data set comprises JPEG compression.

3. The method of claim 1, further comprising:
   storing the first compressed image data set in an image storage device; and
   storing the second compressed image data set in the image storage device if space is available.

4. The method of claim 3, wherein the steps of generating the first and second compressed image data sets are performed by first and second quantizers.

5. The method of claim 1, wherein the step of releasing space in the secondary storage area of the image storage device releases space in a first in first out order.

6. The method of claim 1, wherein the step of releasing space in the secondary storage area of the image storage device releases space in a last in first out order.

7. The method of claim 1, wherein each first compressed image data set stored in the secondary storage area has associated with it an image quality metric and the step of releasing space in the secondary storage area of the image storage device releases space in lowest image quality first order.

8. A system of processing images in a digital camera wherein the digital camera includes primary and secondary storage areas, comprising:
   means for inputting a raw image;
   means for generating from the raw image, including employing a first quantizing step, a first compressed image data set suitable for reproducing substantially the entire image at a first quality level, the first compressed image data set being stored in the primary storage area;
   means for generating from the raw image, including employing a second quantizing step independent of the first quantizing step, a second compressed image data set which supplies at least a least significant bit missing in the first compressed image data set for combination with the first compressed image data set to reproduce substantially the entire image at a second, higher quality level, the second compressed image data set being stored in the secondary storage area; and
   means for releasing space used to store the second compressed image data set associated with the raw image in the secondary storage area of the image storage device to store a first compressed image data set associated with another raw image when insufficient space is available in the primary storage area of the image storage device to store the first compressed image data set associated with another raw image.

9. The system of claim 8, wherein the means for generating a first compressed image data comprises JPEG compression means.

10. The system of claim 8, further comprising:
    means for storing the first compressed image data set in an image storage device; and
    means for storing the second compressed image data set in the image storage device if space is available.

11. The system of claim 10, wherein the means for generating the first compressed image data set and the means for generating the second compressed image data set comprise first and second quantizers.

12. The system of claim 8, wherein the means for releasing space in the secondary storage area of the image storage device releases space in a first in first out order.

13. The system of claim 8, wherein the means for releasing space in the secondary storage area of the image storage device releases space in a last in first out order.

14. The system of claim 8, wherein each first compressed image data set in the secondary storage area has associated with it an image quality metric and the means for releasing space in the secondary storage area of the image storage device releases space in lowest image quality first order.

15. A system for processing images in a digital camera comprising:
- an image storage device, wherein the image storage device comprises primary and secondary storage areas; and
- a processing unit configured to transfer raw image data from an input device, generate a first compressed image data set from the raw image, including employing a first quantizing step, wherein the first data set is suitable for reproducing substantially the entire image at a first quality level, the first compressed image data set being stored in the primary storage area, and generate a second compressed image data set, including employing a second quantizing set independent of the first quantizing step, wherein the second data set supplies at least a least significant bit missing in the first data set for combination with the first data set to reproduce substantially the entire image at a second higher quality level, the second compressed image data set being stored in the secondary storage area if space is available, and the processing unit is further configured to release space used to store the second compressed image data associated with the raw image in the secondary storage area of the image storage device to store a first compressed image data associated with another raw image when insufficient space is available in the primary storage area of the image storage device to store the first compressed image data set associated with another raw image.

16. The system of claim 15, wherein the processing unit is configured to perform JPEG compression to generate the first compressed image data set and the second compressed image data set.

17. The system of claim 15, wherein the processing unit comprises a first quantizer configured to generate the first compressed image data set and a second quantizer configured to generate the second compressed image data set.

18. The system of claim 15, wherein the processing unit is configured to release space in the secondary storage area of the image storage device in a first in first out order.

19. The system of claim 15, wherein the processing unit is configured to release space in the secondary storage area of the image storage device in a last in first out order.

20. The system of claim 15, wherein each first compressed image data set in the secondary storage area has associated with it an image quality metric and the processing unit is configured to release space in the secondary storage area of the image storage device in lowest image quality first order.

* * * * *